US012670733B2

(12) United States Patent
Gao et al.

(10) Patent No.: US 12,670,733 B2
(45) Date of Patent: Jun. 30, 2026

(54) METHOD AND SYSTEM FOR DETERMINING COMPLETE ICON

(71) Applicant: SHANGHAI BLOKS TECHNOLOGY CO., LTD, Shanghai (CN)

(72) Inventors: Chao Gao, Shanghai (CN); Chenlu Liu, Shanghai (CN); Jialiang Zhao, Shanghai (CN); Shanjun Li, Shanghai (CN)

(73) Assignee: SHANGHAI BLOKS TECHNOLOGY CO., LTD, Shanghai (CN)

( * ) Notice: Subject to any disclaimer, the term of this patent is extended or adjusted under 35 U.S.C. 154(b) by 337 days.

(21) Appl. No.: 18/268,630

(22) PCT Filed: Dec. 22, 2021

(86) PCT No.: PCT/CN2021/140259
§ 371 (c)(1),
(2) Date: Jun. 21, 2023

(87) PCT Pub. No.: WO2022/135427
PCT Pub. Date: Jun. 30, 2022

(65) Prior Publication Data
US 2024/0046665 A1 Feb. 8, 2024

(30) Foreign Application Priority Data

Dec. 23, 2020 (CN) .......................... 202011539921.7

(51) Int. Cl.
*G06V 20/60* (2022.01)
*G06T 7/90* (2017.01)
(Continued)

(52) U.S. Cl.
CPC ................ *G06V 20/60* (2022.01); *G06T 7/90* (2017.01); *G06V 10/225* (2022.01);
(Continued)

(58) Field of Classification Search
CPC .... G06V 20/60; G06V 10/225; G06V 10/267; G06V 10/56; G06V 10/751;
(Continued)

(56) References Cited

U.S. PATENT DOCUMENTS 9,131,150 B1 9/2015 Mangiat et al.
2009/0037844 A1* 2/2009 Kim ..................... G06F 3/04842
715/810

(Continued)

FOREIGN PATENT DOCUMENTS

CN 101051341 A * 10/2007
CN 104240228 A 12/2014
(Continued)

OTHER PUBLICATIONS

Ansari, Farah Jamal, and Sumeet Agarwal. "Fast road sign detection and recognition using colour-based thresholding." International Conference on Computer Vision and Image Processing. Singapore: Springer Singapore, 2020. (Year: 2020).*

(Continued)

*Primary Examiner* — Henok Shiferaw
*Assistant Examiner* — Toluwani Mary-Jane Ijaseun
(74) *Attorney, Agent, or Firm* — Bayramoglu Law Offices LLC

(57) ABSTRACT

A method for determining a complete icon includes: acquiring an image, and delineating determination regions in a peripheral region of the image; scanning and counting a number of pixels of a first color corresponding to an icon in the whole image and a number of pixels of a second color corresponding to an auxiliary identifier in each determina-
(Continued)

tion region; determining, if the number of pixels of the first color is less than or equal to a first threshold, or the number of pixels of the second color in one or more determination regions is less than or equal to a second threshold, that the icon is incomplete; and determining, if the number of pixels of the first color is greater than the first threshold, and the number of pixels of the second color in each of the determination regions is greater than the second threshold, that the icon is complete.

6 Claims, 4 Drawing Sheets

(51) Int. Cl.
   *G06V 10/22*          (2022.01)
   *G06V 10/26*          (2022.01)
(52) U.S. Cl.
   CPC .. *G06V 10/267* (2022.01); *G06T 2207/10024* (2013.01); *G06T 2207/30242* (2013.01); *G06T 2207/30252* (2013.01)
(58) Field of Classification Search
   CPC ...... G06V 20/582; G06V 10/25; G06V 20/20; G06V 2201/09; G06V 10/26; G06V 10/175; G06V 20/58; G06V 10/75; G06V 10/255; G06T 7/90; G06T 7/11; G06T 2207/10024; G06T 2207/30242; G06T 2207/30252
   USPC ................................................ 382/164, 382
   See application file for complete search history.

(56)                References Cited

U.S. PATENT DOCUMENTS

| | | | | |
|---|---|---|---|---|
| 2013/0259364 | A1* | 10/2013 | Shindo | G06T 7/11 382/164 |
| 2014/0079321 | A1* | 3/2014 | Huynh-Thu | G06V 20/40 382/203 |
| 2017/0116742 | A1* | 4/2017 | Chang | G06T 7/149 |
| 2018/0253050 | A1* | 9/2018 | Otani | H04N 1/4092 |
| 2019/0332886 | A1* | 10/2019 | Maier | G06F 3/04817 |

FOREIGN PATENT DOCUMENTS

| | | | | | |
|---|---|---|---|---|---|
| CN | 105005461 | A | * | 10/2015 | |
| CN | 105607831 | A | * | 5/2016 | ........ G06F 3/04847 |
| CN | 106971386 | A | | 7/2017 | |
| CN | 110221625 | A | | 9/2019 | |
| CN | 110619290 | A | | 12/2019 | |
| CN | 111625003 | A | | 9/2020 | |
| CN | 112597893 | A | | 4/2021 | |
| WO | WO-2019165681 | A1 | * | 9/2019 | ........... G06F 3/0481 |

OTHER PUBLICATIONS

Gudigar, Anjan, et al. "Multiple thresholding and subspace based approach for detection and recognition of traffic sign." Multimedia tools and applications 76 (2017): 6973-6991. (Year: 2017).*
Park, Jongan, Waqas Rasheed, and Junguk Beak. "Robot navigation using camera by identifying arrow signs." 2008 The 3rd International Conference on Grid and Pervasive Computing-Workshops. IEEE, 2008. (Year: 2008).*
Andrey, Vavilin, and Kang Hyun Jo. "Automatic detection and recognition of traffic signs using geometric structure analysis." 2006 SICE-ICASE International Joint Conference. IEEE, 2006. (Year: 2006).*
Arroyo, Javier, MarÃ-a Guijarro, and Gonzalo Pajares. "An instance-based learning approach for thresholding in crop images under different outdoor conditions." Computers and Electronics in Agriculture 127 (2016): 669-679 (Year: 2016).*
Yunchao Wei, et al., TS2C: Tight Box Mining with Surrounding Segmentation Context for Weakly Supervised Object Detection, Lecture Notes in Computer Science, 2018, pp. 454-470, 11215.

* cited by examiner

METHOD AND SYSTEM FOR DETERMINING COMPLETE ICON

CROSS REFERENCE TO THE RELATED APPLICATIONS

This application is the national phase entry of International Application No. PCT/CN2021/140259, filed on Dec. 22, 2021, which is based upon and claims priority to Chinese Patent Application No. 202011539921.7, filed on Dec. 23, 2020, the entire contents of which are incorporated herein by reference.

TECHNICAL FIELD

The present disclosure relates to the technical field of image recognition, and in particular to a method and system for determining a complete icon in a moving state.

BACKGROUND

A mobile robot is an intelligent robot which is programmed for a preset route and travels along the preset route according to a preset rule.

The patent literature CN 111625003A provides a mobile robot toy and a use method thereof. The mobile robot moves on the bearing surface according to the road section to search and read an instruction card for obtaining a corresponding action instruction, and execute an action according to any one of the following ways: executing the action according to a single instruction card; executing the action according to a combination of a plurality of instruction cards; executing the action according to a combination of an instruction card and the road section; and executing the action according to a combination of an instruction card and identifier information on the bearing surface. The mobile robot can be controlled with simple operation. Because of no complicated programming work, the mobile robot can be used by children conveniently. However, the following problems are presented in actual use:

As shown in FIG. 1, while moving, the mobile robot recognizes an icon 1 on an instruction card. This inevitably causes long image recognition time. Moreover, under influences of a speed of the mobile robot and an image recognition occasion, one frame of image is recognized by an image recognition algorithm at about 100 ms. When an early recognition occurs, only a part of the icon 1 in the recognized image falls within the recognition range 2, which causes a miss of the instruction card.

In addition, the conventional icon can only be recognized as an instruction, and only can be accurately recognized when the icon enters the image completely. The icon itself cannot provide any technical assistance in determining whether the icon is completely entering into the image.

SUMMARY

In view of defects in the prior art, an objective of the present disclosure is to provide a method and system for determining a complete icon.

The present disclosure provides a method for determining a complete icon, including:

an image acquiring step: acquiring a frame of image, and delineating determination regions in a peripheral region of the image;

an image scanning step: scanning and counting a number of pixels of a color corresponding to an icon in the whole image and a number of pixels of a color corresponding to an auxiliary identifier in each of the determination regions; and a determining step: determining, if the number of pixels of the color corresponding to the icon in the image is less than or equal to a first threshold, or the number of pixels of the color corresponding to the auxiliary identifier in one or more of the determination regions is less than or equal to a second threshold, that the icon of the image is incomplete; and determining, if the number of pixels of the color corresponding to the icon in the image is greater than the first threshold, and the number of pixels of the color corresponding to the auxiliary identifier in each of the determination regions is greater than the second threshold, that the icon of the image is complete.

Preferably, the determination regions form a closed-loop annular structure along an edge of the image.

Preferably, the method further includes: returning to acquire a next frame of image if determining that the icon of the image is incomplete; and performing image recognition on the icon if determining that the icon of the image is complete.

Preferably, the color of the auxiliary identifier differs from the color of the icon.

Preferably, the determination regions form a closed-loop rectangular annular structure along an edge of the image; and the determining step includes:

determining, if the number of pixels of the color corresponding to the icon in the image is less than or equal to the first threshold, and the number of pixels of the color corresponding to the auxiliary identifier in each of two determination regions serving as opposite sides of a rectangle is less than or equal to the second threshold, that the icon of the image is incomplete; and determining, if the number of pixels of the color corresponding to the icon in the image is greater than the first threshold, and the number of pixels of the color corresponding to the auxiliary identifier in each of the two determination regions serving as the opposite sides of the rectangle is greater than the second threshold, whether a straight line is present in each of the other two determination regions; determining, if a determination result indicates no, that the icon of the image is incomplete; and determining if the determination result indicates yes, that the icon of the image is complete.

Preferably, the icon has a first color, the auxiliary identifier has a second color, and a region of the second color or an inner envelope for the region of the second color surrounds a region of the first color; and the determining step includes:

determining, if pixels of the first color are present at an edge of the image, and a number of the pixels of the first color is greater than a third threshold, that the icon of the image is incomplete; and determining, if pixels of the first color are present in the image, a number of the pixels of the first color in the image is not less than the first threshold, and a number of pixels of the second color at the edge of the image is greater than a fourth threshold, that the icon of the image is complete.

The present disclosure provides a system for determining a complete icon, including:

an image acquiring module, configured to acquire a frame of image, and delineate determination regions in a peripheral region of the image;

an image scanning module, configured to scan and count a number of pixels of a color corresponding to an icon in the whole image and a number of pixels of a color corresponding to an auxiliary identifier in each of the determination regions; and a determining module, configured to determine, if the number of pixels of the color corresponding to the icon in the image is less than or equal to a first threshold, or the number of pixels of the color corresponding to the auxiliary identifier in one or more of the determination regions is less than or equal to a second threshold, that the icon of the image is incomplete; and determine, if the number of pixels of the color corresponding to the icon in the image is greater than the first threshold, and the number of pixels of the color corresponding to the auxiliary identifier in each of the determination regions is greater than the second threshold, that the icon of the image is complete.

Preferably, the determination regions form a closed-loop annular structure along an edge of the image.

Preferably, the system acquires a next frame of image if determining that the icon of the image is incomplete; and the system performs image recognition on the icon if determining that the icon of the image is complete.

Preferably, the color of the auxiliary identifier differs from the color of the icon.

Preferably, the determination regions form a closed-loop rectangular annular structure along an edge of the image; and the determining module is configured to:

determine, if the number of pixels of the color corresponding to the icon in the image is less than or equal to the first threshold, and the number of pixels of the color corresponding to the auxiliary identifier in each of two determination regions serving as opposite sides of a rectangle is less than or equal to the second threshold, that the icon of the image is incomplete; and determine, if the number of pixels of the color corresponding to the icon in the image is greater than the first threshold, and the number of pixels of the color corresponding to the auxiliary identifier in each of the two determination regions serving as the opposite sides of the rectangle is greater than the second threshold, whether a straight line is present in each of the other two determination regions; determine, if a determination result indicates no, that the icon of the image is incomplete; and determine, if the determination result indicates yes, that the icon of the image is complete.

Preferably, the icon has a first color, the auxiliary identifier has a second color, and a region of the second color or an inner envelope for the region of the second color surrounds a region of the first color; and the determining module is configured to:

determine, if pixels of the first color are present at an edge of the image, and a number of the pixels of the first color is greater than a third threshold, that the icon of the image is incomplete; and determine, if pixels of the first color are present in the image, a number of the pixels of the first color in the image is not less than the first threshold, and a number of pixels of the second color at the edge of the image is greater than a fourth threshold, that the icon of the image is complete.

Compared with the prior art, the present disclosure has following beneficial effects:

1. With limited computing resources, the present disclosure can perform recognition operation when the image is complete. For example, if the recognition operation is performed on the recognized incomplete image, when a vehicle moves above the image at a next moment and the complete image can be acquired, the recognition operation cannot be performed on the complete image timely due to the ongoing recognition operation on the incomplete image.

2. The present disclosure can realize the recognition operation quickly, can lower configuration requirements on hardware, and achieves a higher recognition efficiency. Meanwhile, when the present disclosure is applied to the mobile robot, a movement speed of the mobile robot can be doubled.

BRIEF DESCRIPTION OF THE DRAWINGS

Other features, objectives, and advantages of the present disclosure will become more apparent by reading the detailed description of non-limiting embodiments with reference to the following drawings.

DETAILED DESCRIPTION OF THE EMBODIMENTS

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

Embodiment 1

Figure 3:
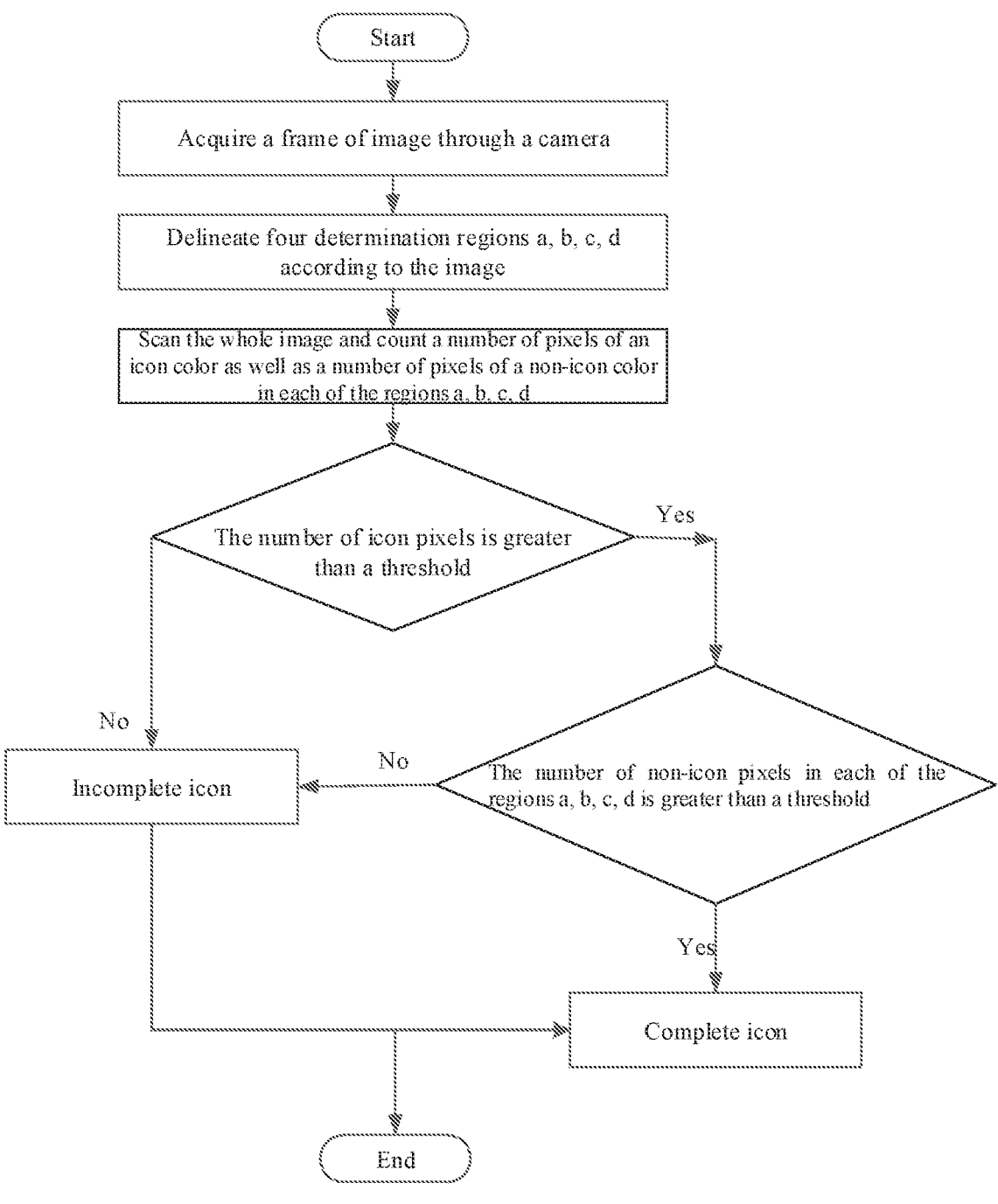
FIG. 3 is a flowchart of Embodiment 1.

As shown in FIG. 3, the embodiment provides a method for determining a complete icon, including: an image acquiring step, an image scanning step, and a determining step.

Figure 1:
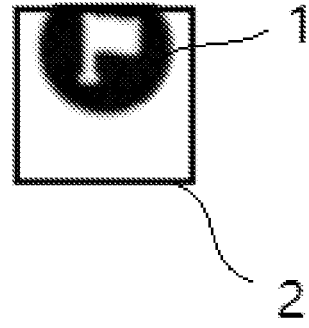
FIG. 1 is a schematic view illustrating that an icon is not completely acquired and cannot be recognized.
Figure 2:
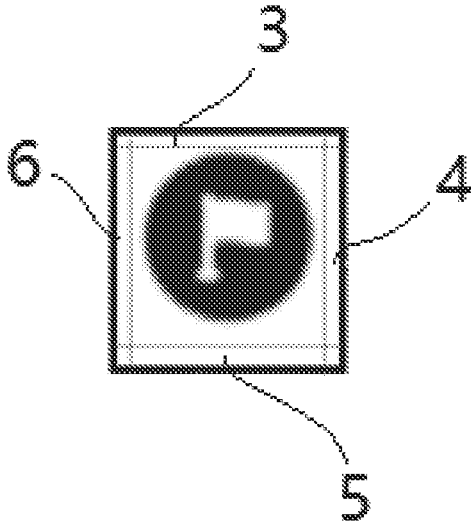
FIG. 2 is a schematic view illustrating delineation of a determination region.

In the image acquiring step: A frame of image is acquired, and determination regions are delineated in a peripheral region of the image. The determination regions form a closed-loop annular structure along an edge of the image, so as to ensure that the edge of the image does not contain an icon content, or contains a minimum icon content. The closed-loop annular structure may be a rectangular structure shown in FIG. 2, including first determination region 3, second determination region 4, third determination region 5, and fourth determination region 6 (corresponding to regions a, b, c and d in FIG. 3). Certainly, in other embodiments, the closed-loop annular structure may also be a complete circular ring, or a complete and combined polygonal ring.

For the sake of a higher accurate rate of recognition in the embodiment, noise filtering may be performed on the acquired image to remove an interference factor from the image according to a preset rule, and then the image scanning step is executed. The noise filtering on the image may be realized with a prior art, such as spatial filtering, wavelet threshold denoising based on a wavelet domain, partial differential equation (PDE)-based denoising, and total variation (TV) denoising, but is not limited in the present disclosure.

In the image scanning step: A number of pixels of a color corresponding to an icon in the whole image and a number of pixels of a color corresponding to an auxiliary identifier in each of the determination regions are scanned and counted. In the embodiment, the icon corresponds to black pixels, and the auxiliary identifier corresponds to white pixels. The icon and the auxiliary identifier have different colors for ease of recognition.

In the determining step: If the number of pixels of the color corresponding to the icon in the image is less than or equal to a first threshold, or the number of pixels of the color corresponding to the auxiliary identifier in one or more of the determination regions is less than or equal to a second threshold, it is determined that the icon of the image is incomplete. If the number of pixels of the color corresponding to the icon in the image is greater than the first threshold, and the number of pixels of the color corresponding to the auxiliary identifier in each of the determination regions is greater than the second threshold, it is determined that the iron of the image is complete.

The method further includes returning to acquire a next frame of image if determining that the icon of the image is incomplete, and performing image recognition on the icon if determining that the icon of the image is complete.

In addition, considering that the acquired image may include incomplete icon and auxiliary identifier, the icon may have a first color, and the auxiliary identifier may have a second color in the embodiment. The first color is different from the second color. A region of the second color or an inner envelope for the region of the second color surrounds a region of the first color. In the present disclosure, the first color is not limited to only one color, and may also be a combination of various colors. The second color is also not limited to only one color, and may also be a combination of various colors.

The determining step includes:

If pixels of the first color are present at an edge of the image, and a number of the pixels of the first color is greater than a third threshold, it is considered that the second color in the image does not completely surround the first color, and determined that the icon of the image is incomplete. If pixels of the first color are present in the image, a number of the pixels of the first color is not less than the first threshold, and a number of pixels of the second color at the edge of the image is greater than a fourth threshold, it is considered that the second color in the image completely surrounds the first color, and determined that the icon of the image is complete.

With the method for determining whether the icon is complete, the present disclosure cannot miss the icon in quick advancement of a vehicle, can lower configuration requirements on hardware, achieves a higher recognition efficiency, and doubles a movement speed of the vehicle.

Embodiment 2

Figures 4, 5:
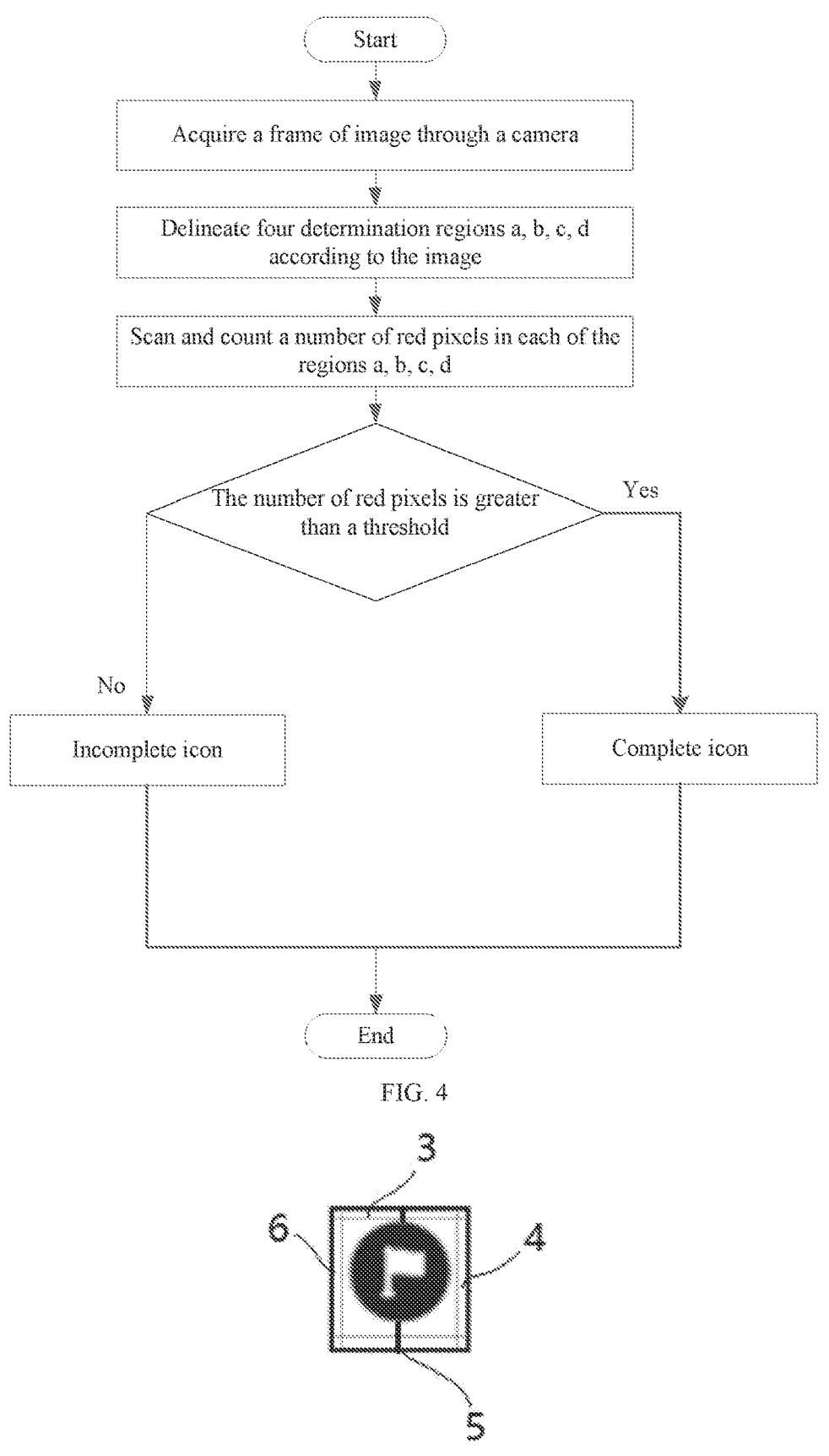
FIG. 4 is a flowchart of Embodiment 2.
FIG. 5 is a schematic view of an icon on a route.

As shown in FIG. 4, on the basis of Embodiment 1, the embodiment changes the auxiliary identifier as red pixels, and has a same determination principle as Embodiment 1.

Embodiment 3

Figure 6:
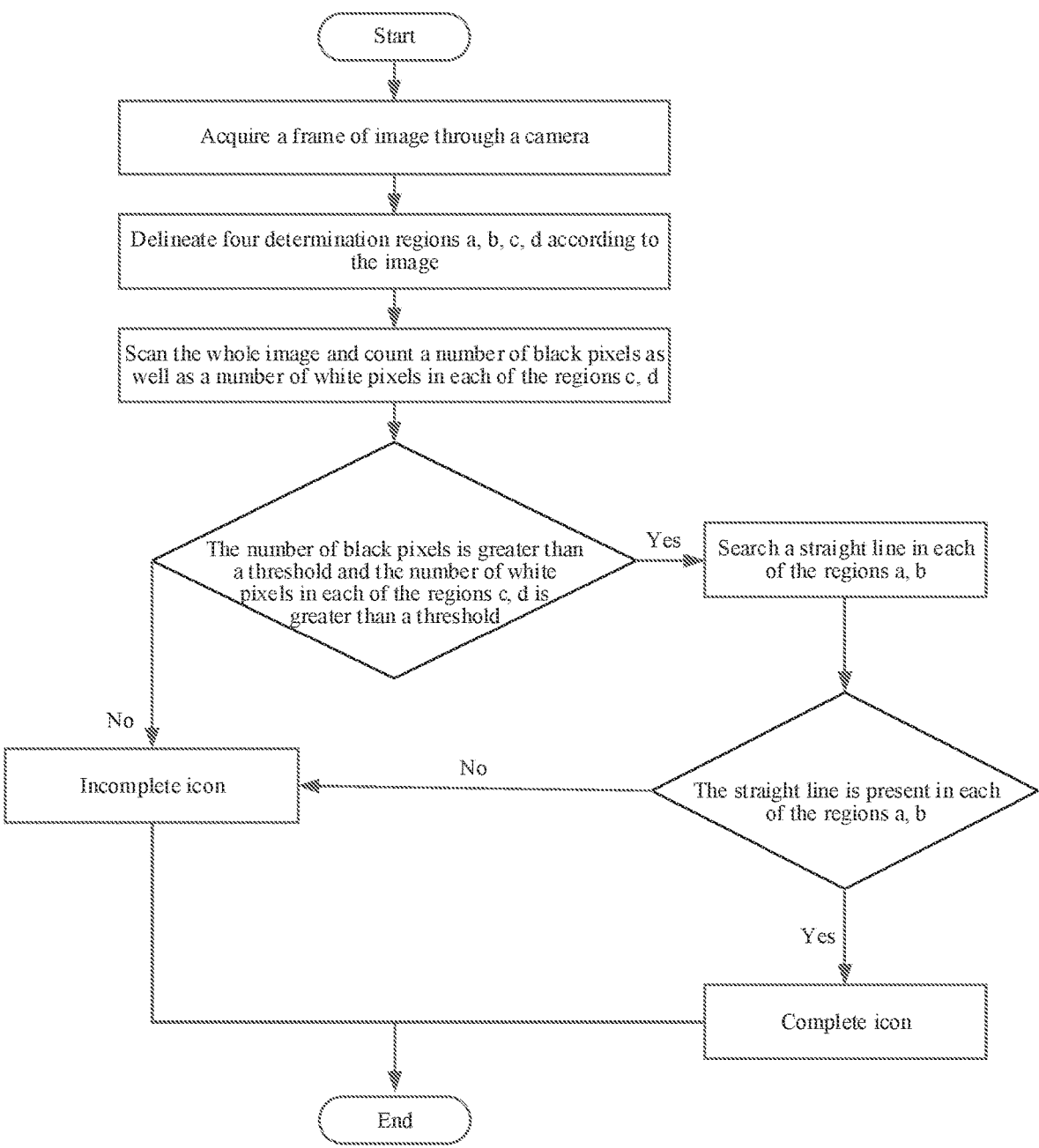
FIG. 6 is a flowchart of Embodiment 3.

Considering that the icon 1 may be directly superposed on an identifier (including a straight line, a triangle, a quadrilateral, a polygon and other regular or irregular auxiliary images representing an advancement route) in a map in FIG. 5, following improvements are made on the basis of Embodiment 1, as shown in FIG. 6:

In the image acquiring step: A frame of image is acquired, and determination regions are delineated in a peripheral region of the image. The determination regions form a closed-loop annular structure along an edge of the image, so as to ensure that the edge of the image does not contain an icon content, or contains a minimum icon content. The closed-loop annular structure may be a rectangular structure shown in FIG. 2, including first determination region 3, second determination region 4, third determination region 5, and fourth determination region 6. Certainly, in other embodiments, the closed-loop annular structure may also be a complete circular ring, or a complete and combined polygonal ring.

In the image scanning step: A number of pixels of a color corresponding to an icon in the whole image and a number of pixels of a color corresponding to an auxiliary identifier in each of the determination regions are scanned and counted. In the embodiment, the icon corresponds to black pixels, and the auxiliary identifier corresponds to white pixels. The icon and the auxiliary identifier have different colors for ease of recognition.

In the determining step. If the number of pixels of the color corresponding to the icon in the image is less than or equal to a first threshold, and the number of pixels of the color corresponding to the auxiliary identifier in each of two determination regions (corresponding to regions 4 and 6 in FIG. 5) serving as opposite sides of a rectangle is less than or equal to the second threshold, it is determined that the icon of the image is incomplete. Or otherwise, whether a straight line is present in each of the other two determination regions (corresponding to regions 3 and 5 in FIG. 5) is determined. If a determination result indicates no, it is determined that the icon of the image is incomplete. If the determination result indicates yes, it is determined that the icon of the image is complete.

The method further includes returning to acquire a next frame of image if determining that the icon of the image is incomplete, and performing image recognition on the icon if determining that the icon of the image is complete.

Those skilled in the art are aware that in addition to being realized by using pure computer-readable program code, the system and each apparatus, module, and unit thereof provided in the present disclosure can realize a same program in a form of a logic gate, a switch, an application-specific integrated circuit, a programmable logic controller, or an embedded microcontroller by performing logic programming on the method steps. Therefore, the system and each apparatus, module, and unit thereof provided in the present disclosure can be regarded as a kind of hardware component. The apparatus, module, and unit included therein for realizing each function can also be regarded as a structure in the hardware component; and the apparatus, module, and unit for realizing each function can also be regarded as a software module for implementing the method or a structure in the hardware component.

The specific examples of the present disclosure are described above. It should be understood that the present disclosure is not limited to the above specific implementations, and a person skilled in the art can make various variations or modifications within the scope of the claims without affecting the essence of the present disclosure. The examples of the present disclosure and features in the examples may be arbitrarily combined with each other in a non-conflicting situation.

What is claimed is:

1. A method for determining a complete icon, comprising:
an image acquiring step: acquiring a frame of image, and delineating determination regions in a peripheral region of the image;
an image scanning step: scanning and counting a number of pixels of a color corresponding to an icon in a whole image and a number of pixels of a color corresponding to an auxiliary identifier in each of the determination regions; and
a determining step: determining, when the number of pixels of the color corresponding to the icon in the image is less than or equal to a first threshold, or the number of pixels of the color corresponding to the auxiliary identifier in one or more of the determination regions is less than or equal to a second threshold, that the icon of the image is incomplete; and determining, when the number of pixels of the color corresponding to the icon in the image is greater than the first threshold, and the number of pixels of the color corresponding to the auxiliary identifier in each of the determination regions is greater than the second threshold, that the icon of the image is complete,
wherein the determination regions form a closed-loop rectangular annular structure along an edge of the image when the icon of the image is complete and when the icon of the image is incomplete,
wherein
the determining step comprises:
determining, when the number of pixels of the color corresponding to the icon in the image is less than or equal to the first threshold, and the number of pixels of the color corresponding to the auxiliary identifier in each of two determination regions serving as opposite sides of a rectangle is less than or equal to the second threshold, that the icon of the image is incomplete; and
determining, when the number of pixels of the color corresponding to the icon in the image is greater than the first threshold, and the number of pixels of the color corresponding to the auxiliary identifier in each of the two determination regions serving as the opposite sides of the rectangle is greater than the second threshold, whether a straight line is present in each of two other determination regions; determining, when a determination result indicates no, that the icon of the image is incomplete; and determining, when the determination result indicates yes, that the icon of the image is complete.

2. The method for determining the complete icon according to claim 1, wherein the method further comprises: returning to acquire a next frame of image when the icon of the image is incomplete; and performing image recognition on the icon when the icon of the image is complete.

3. The method for determining the complete icon according to claim 1, wherein the color of the auxiliary identifier differs from the color of the icon.

4. A method for determining a complete icon, comprising:
an image acquiring step: acquiring a frame of image, and delineating determination regions in a peripheral region of the image;
an image scanning step: scanning and counting a number of pixels of a color corresponding to an icon in a whole image and a number of pixels of a color corresponding to an auxiliary identifier in each of the determination regions; and
a determining step: determining, when the number of pixels of the color corresponding to the icon in the image is less than or equal to a first threshold, or the number of pixels of the color corresponding to the auxiliary identifier in one or more of the determination regions is less than or equal to a second threshold, that the icon of the image is incomplete; and determining, when the number of pixels of the color corresponding to the icon in the image is greater than the first threshold, and the number of pixels of the color corresponding to the auxiliary identifier in each of the determination regions is greater than the second threshold, that the icon of the image is complete,
wherein the determination regions form a closed-loop rectangular annular structure along an edge of the image when the icon of the image is complete and when the icon of the image is incomplete,
wherein the icon has a first color, the auxiliary identifier has a second color, and a region of the second color or an inner envelope for the region of the second color surrounds a region of the first color; and
the determining step comprises:
determining, when first pixels of the first color are present at an edge of the image, and a number of the first pixels of the first color is greater than a third threshold, that the icon of the image is incomplete; and
determining, when second pixels of the first color are present in the image, a number of the second pixels of the first color in the image is greater than or equal to the first threshold, and a number of pixels of the second color at the edge of the image is greater than a fourth threshold, that the icon of the image is complete.

5. A system for determining a complete icon, comprising:
an image acquiring module, configured to acquire a frame of image, and delineate determination regions in a peripheral region of the image;
an image scanning module, configured to scan and count a number of pixels of a color corresponding to an icon in a whole image and a number of pixels of a color corresponding to an auxiliary identifier in each of the determination regions; and
a determining module, configured to determine, when the number of pixels of the color corresponding to the icon in the image is less than or equal to a first threshold, or the number of pixels of the color corresponding to the auxiliary identifier in one or more of the determination regions is less than or equal to a second threshold, that the icon of the image is incomplete; and determine, when the number of pixels of the color corresponding to the icon in the image is greater than the first threshold, and the number of pixels of the color corresponding to the auxiliary identifier in each of the determination regions is greater than the second threshold, that the icon of the image is complete, wherein the determination regions form a closed-loop rectangular annular structure along an edge of the image when the icon of the image is complete and when the icon of the image is incomplete,
wherein the icon has a first color, the auxiliary identifier has a second color, and a region of the second color or an inner envelope for the region of the second color surrounds a region of the first color; and the determining module is configured to:

determine, when first pixels of the first color are present at an edge of the image, and a number of the first pixels of the first color is greater than a third threshold, that the icon of the image is incomplete; and determine, when second pixels of the first color are present in the image, a number of the second pixels of the first color in the image is greater than or equal to the first threshold, and a number of pixels of the second color at the edge of the image is greater than a fourth threshold, that the icon of the image is complete.

6. The system for determining the complete icon according to claim 5, wherein the system acquires a next frame of image when the icon of the image is incomplete; and the system performs image recognition on the icon when the icon of the image is complete.

\* \* \* \* \*